(12) United States Patent
Kelleher

(10) Patent No.: US 8,322,650 B2
(45) Date of Patent: Dec. 4, 2012

(54) AIRCRAFT

(75) Inventor: Christopher Charles Kelleher, Hampshire (GB)

(73) Assignee: Qinetiq Limited (GB)

( * ) Notice: Subject to any disclaimer, the term of this patent is extended or adjusted under 35 U.S.C. 154(b) by 308 days.

(21) Appl. No.: 12/847,004

(22) Filed: Jul. 30, 2010

(65) Prior Publication Data

US 2011/0031354 A1    Feb. 10, 2011

(30) Foreign Application Priority Data

Aug. 5, 2009 (GB) .................................. 0913602.9

(51) Int. Cl.
*B64C 39/12* (2006.01)
(52) U.S. Cl. .................................. 244/45 R; 244/199.4
(58) Field of Classification Search ............... 244/45 R, 244/47, 34 R, 19.8 R, 199.4
See application file for complete search history.

(56) References Cited

U.S. PATENT DOCUMENTS

| | | | | |
|---|---|---|---|---|
| 2,326,819 A * | 8/1943 | Berlin | ............................... | 244/13 |
| 3,260,481 A | 7/1966 | Winbom, Jr. | | |
| 3,884,432 A | 5/1975 | Blanchard, Jr. et al. | | |
| 4,050,397 A * | 9/1977 | Vanderleest | ................... | 114/274 |
| 4,108,403 A * | 8/1978 | Finch | .......................... | 244/199.2 |
| 4,538,779 A * | 9/1985 | Goldstein | ....................... | 244/87 |
| 5,158,251 A * | 10/1992 | Taylor | ........................ | 244/199.3 |
| 5,332,362 A * | 7/1994 | Toulmay et al. | ........... | 416/223 R |
| 5,634,613 A * | 6/1997 | McCarthy | ................... | 244/199.1 |
| 5,810,284 A | 9/1998 | Hibbs et al. | | |
| 2004/0118969 A1* | 6/2004 | MacCready et al. | ............... | 244/5 |
| 2008/0001028 A1 | 1/2008 | Kendall et al. | | |
| 2010/0224734 A1* | 9/2010 | Grip | .............................. | 244/219 |
| 2012/0056038 A1* | 3/2012 | Grip | .............................. | 244/213 |

FOREIGN PATENT DOCUMENTS

| | | |
|---|---|---|
| WO | WO2004/106156 | 12/2004 |
| WO | WO2006/030213 | 3/2006 |
| WO | WO2007/031732 | 3/2007 |

* cited by examiner

*Primary Examiner* — Christopher P Ellis
*Assistant Examiner* — Medhat Badawi
(74) *Attorney, Agent, or Firm* — McDonnell Boehnen Hulbert & Berghoff LLP

(57) ABSTRACT

An aircraft, particularly a solar powered, high altitude, long endurance, unmanned aerial vehicle, is equipped with a combination of canted down, raked back wing tips and trailing "tip tails" carried on booms from the tip regions of the mainplane. Each tip tail is positioned to be subject to the upwash field of the respective wing tip vortex, at least in the cruise condition of the aircraft. The wing tip form can achieve a reduction in induced drag and help to relieve wing root bending moment while the tip tails can act through their connections to the mainplane to provide torsional relief to the latter, particularly under lower incidence/higher speed conditions. In the higher incidence/lower speed cruise condition, however, the presence of the tip tails in the upwash fields of the wing tip vortices means that they can generate lift with a component in the forward direction of flight and hence contribute to the thrust requirements of the aircraft.

17 Claims, 1 Drawing Sheet

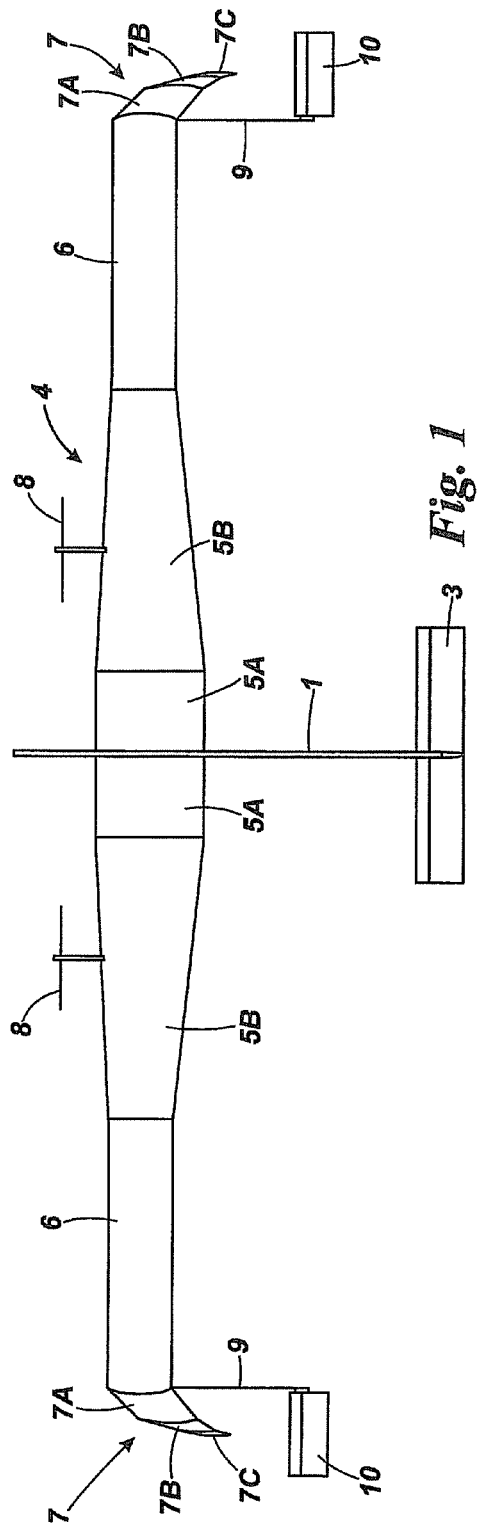
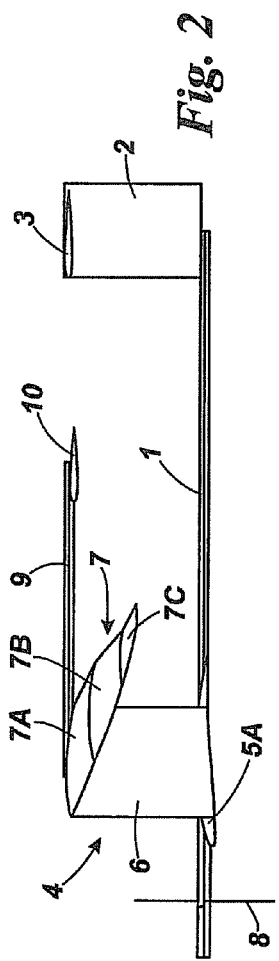
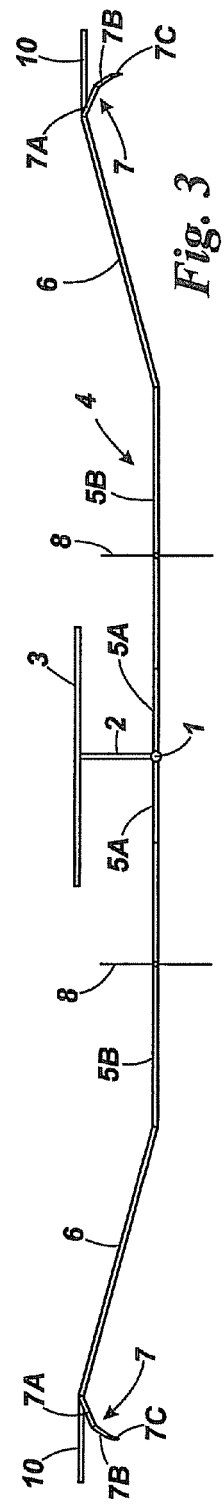
Fig. 1
Fig. 2
Fig. 3

AIRCRAFT

FIELD OF THE INVENTION

The present invention relates to aircraft and is more particularly (though not exclusively) concerned with high altitude, long endurance, solar powered, unmanned aerial vehicles (UAVs).

BACKGROUND OF THE INVENTION

Solar powered UAVs have been proposed for use as long endurance aerial platforms, flying in the generally benign conditions of the stratosphere (typically at altitudes between 15,000 and 30,000 m), for such roles as communications relay, earth observation, weather monitoring, surveillance and mapping. In this respect they may provide a cost-effective alternative to the earth-orbital satellites conventionally used for these purposes and have the additional advantage that they can be easily controlled to remain in sight of a selected part of the globe, by circling or following some other suitable flight pattern, or to fly to any other desired station. Such proposed aircraft typically comprise a lightweight structure including at least a mainplane, one or more electrically-driven thrust-producing motors, an array of photovoltaic cells, and electric storage means such as rechargeable batteries or regenerative fuel cells. Examples of such aircraft are described in U.S. Pat. No. 5,810,284 and WO2004/106156. In principle aircraft of this kind can be capable of remaining aloft indefinitely, i.e. so-called "perpetual flight", limited only by the integrity of their airframe, power and control systems and mechanical components, by following a diurnal flight pattern in which, during the hours of daylight, the power generated by the photovoltaic cells is used to drive the motors at high power to climb the aircraft from a base operational altitude to a higher operational altitude and to charge the electric storage means and, during the hours of darkness, the motors are driven at lower power from the storage means and the aircraft is allowed to descend to the base (though still stratospheric) operational altitude, and so on. Alternatively the aircraft may remain at a substantially constant operational altitude throughout both the day and night if its electric storage means are of sufficient capacity to maintain altitude during the hours of darkness.

It will be appreciated that to make best use of the finite power resources available for such an aircraft it should be as aerodynamically efficient as possible while avoiding or minimising any consequent weight penalty. For this reason the invention proposes the use of a mainplane with canted down tips, generally in accordance with the teachings of WO2006/030213. Tips of this type have been found to achieve a reduction of induced drag and help to relieve wing root bending moment. The latter effect is particularly enhanced when the tip is also raked back in planform, featuring a leading edge sweep and trailing edge sweep both increasing, and a chord reducing, in the outboard direction of the device.

SUMMARY OF THE INVENTION

More than this, however, in one aspect the present invention resides in an aircraft comprising a mainplane with canted down tips; and wherein an additional plane is carried from an outboard location of each wing of said mainplane and positioned aft with respect to the respective said tip, preferably to be subject to the upwash field of the respective mainplane tip vortex, at least in the cruise condition of the aircraft.

The additional planes of an aircraft according to the invention—which for convenience will be referred to herein as "tip tails"—can act through their connection to the mainplane to provide torsional relief to the latter, particularly in the lower incidence/higher speed case where it is most required and in which the tip tails will be arranged to be in download. In this respect it is well known that positive camber aerofoils such as those useful as the main lifting surface of an aircraft have an inherent pitch down moment, which increases with speed. This causes a tendency for the outer part of the wing to twist downwards and normally requires significant structural mass to cope with these loads, particularly with longer spans and higher speeds. By relieving these loads with the tip tails in accordance with the invention, however, it is possible to reduce the mass of the mainplane and/or to increase operating speed for a given mass. At the same time the presence of the tip tails enables the size and mass of any conventional central tail plane(s) to be reduced while maintaining pitch stability— or to provide all requisite stability in the case of a "flying wing" design where no central tail plane is provided.

By positioning these tip tails to be subject to the upwash fields of respective vortices from the canted down mainplane tips in accordance with the invention they can themselves be smaller and lighter than if fitted to a mainplane with conventional tips. This is because the tendency of the canted down tips is to place the tip vortices initially further outboard and somewhat lower than a conventional tip. As the vortex sheet wraps up behind the mainplane and moves further inboard, however, the upwash field is located at an optimum position behind each wing for interaction with a trailing tip tail and its effect is concentrated, so adding to the efficiency of the tip tails. Also by virtue of the interaction of the vortex upwash fields with the tip tails the latter can be at a negative angle of physical incidence behind the mainplane and yet have a positive angle of attack with respect to the local relative airflow, particularly in the higher incidence/lower speed cruise condition of the aircraft where general torsional relief for the mainplane is of less importance, thus generating lift with a component in the forward direction of flight and contributing to the thrust requirements of the aircraft.

BRIEF DESCRIPTION OF THE DRAWINGS

These and other aspects and features of the invention will now be more particularly described, by way of example, with reference to the accompanying drawings, in which:—

FIG. 1 is a plan view of one embodiment of an aircraft according to the invention;

FIG. 2 is a side view of the aircraft of FIG. 1; and

FIG. 3 is a front view of the aircraft of FIG. 1.

DETAILED DESCRIPTION OF THE PREFERRED EMBODIMENT

The aircraft of FIGS. 1 to 3 is a high altitude, long endurance, solar powered UAV. It comprises a tubular fuselage 1 with a tail fin 2 carrying a tailplane 3, and a mainplane 4. Each wing of the mainplane has an inboard portion 5A, 5B, outboard portion 6 and tip 7, as will be described more fully hereinafter. Substantially the whole of the upper surface of each wing portion 5A, 5B and 6 is covered with arrays of photovoltaic cells (not separately shown), or such cells may be housed within the mainplane structure beneath a transparent upper skin. Its powerplant comprises a pair of wing-mounted brushless DC electric motors (not seen) each driving a respective propeller 8, although other embodiments may comprise a different number of such powerplant depending on the size of airframe and motor rating. Housed within the mainplane structure are a plurality of rechargeable lithium ion batteries or regenerative fuel cells.

In use the UAV will be flown to a desired stratospheric altitude and may remain aloft for an indefinite period, with power being supplied by the photovoltaic cell arrays to its motors and to charge the onboard batteries or fuel cells during the hours of daylight, and power stored by the batteries/fuel cells being supplied to the motors during the hours of darkness. In this way the aircraft is intended to be capable of "perpetual" flight in accordance with known principles.

The airframe weight is minimised, the fuselage 1 and wing and tail spars and ribs being constructed of a carbon fibre-reinforced polymer composite, leading edge mouldings of a high performance rigid foam material such as Rohacell®, and the wing and tail surfaces a Mylar® skin.

Pitch control may be provided by an elevator on the tailplane 3, or the tailplane may be of the all-moving type for this purpose. Yaw control may be provided by a rudder on the fin 2 or by differential thrust from the propellers 8. Roll control may be provided by ailerons or spoilers on the outboard wing portions 6 or by spoilers on the tips 7 or simply as a secondary effect of the chosen form of yaw control. Pitch and/or roll control may alternatively be provided by actuation of the tip tails to be described below.

Control of the aircraft's flying controls, powerplant and payload equipment can be exercised via a radio or laser link from the ground or via satellite from a remote ground station and/or by an onboard computer, and data can be transmitted from the aircraft to the ground over similar communications links. Its payload can be carried in the region of the fuselage/wing root junction or distributed in multiple modules across the mainplane and will comprise such communications, monitoring or other equipment as may be appropriate for its operational role, examples of which are mentioned in the introduction.

Returning to the form of the mainplane 4, it is essentially straight (i.e. unswept) except at the tips. The root portion 5A of each wing has little or no dihedral and is of constant chord, and is followed by a portion 5B of little or no dihedral and a continuously reducing chord in the outboard direction. The outboard portion 6 has a positive dihedral angle (15° in the illustrated embodiment) and is of constant chord. The tip 7 is formed from three discrete plane portions 7A, 7B and 7C which collectively define a structure generally in accordance with the teachings of WO2006/030213. That is to say, as seen particularly in FIG. 3, the tip is canted downwards with the cant angle increasing in the outboard direction with each successive portion 7A-7C, and with a maximum approaching 90° at the extremity of the tip. In planform, as seen particularly in FIG. 1, the tip is raked back, with the sweep angles of the leading and trailing edges increasing, and the chord reducing, in the outboard direction with each successive portion 7A-7C, and with the sweep angle of the leading edge reaching a maximum of approximately 90° at the extremity of the tip. The aft extension of the tip, that is to say the distance as viewed in plan by which the trailing edge at its extremity is located aft of the trailing edge at the root of the tip, is approximately equal to the aerofoil chord length at the root. As is known, tips of this form can achieve a reduction in induced drag and help to relieve wing root bending moment.

The mainplane 4 is designed to be span loaded—that is to say the primary bending loads of lift and accelerated unit mass are distributed along each wing—which assists in minimising the structural mass of the wing. The large chord root portion permits high local payload masses coupled with high local lift. The taper and camber of the wing are optimised to provide a near elliptical lift distribution and hence a low induced drag. The combination of tapered portion 5B and untapered portion 6 provides a higher aspect ratio and minimum Reynolds number than a continuous taper for the same overall wing area, together with improved stall handling and control due to the greater tip chord and greater lift and mass near the centre, thus reducing roll and yaw inertias.

In accordance with the present invention some span loading of the torsional loads in the mainplane 4 is also achieved by provision of an additional trailing plane in association with each wing tip 7.

With further reference to the Figures, a boom 9 is attached at the junction between each wing portion 6 and tip 7 and extends aft, generally parallel to the longitudinal axis of the aircraft, carrying at its trailing end a plane 10 ("tip tail") which extends from the boom to lie behind and above and extend outboard with respect to the tip. More particularly the tip tail 10 is positioned to be subject to the upwash field of the vortex shed from the respective wing tip 7, at least in the cruise condition of the aircraft. In this respect the effect of the downwardly-canted tip 7 is to position the vortex trail initially further outward and downward as compared to a conventional tip, and thus to position the upwash field optimally for interaction with the trailing tip tail 10 as previously explained. The tip tails can therefore be smaller and lighter than would be the case if conventional tips were fitted. The upwash field is typically established at a distance behind the wing equal to approximately twice the wing chord length at the root of the tip 7 and the length of the boom 9 is selected accordingly.

The tip tails 10 will tend to go into download at low incidence of the mainplane 4. Hence they can act through the booms 9 to reduce torsion in the mainplane due to its inherent negative pitching moment and thereby allow its structural mass to be reduced and/or an increase in operating speed for a given mass. This is particularly important at low incidence, and consequently at higher speed, since the torsion is proportional to the square of airspeed. The presence of the tip tails also enables a smaller and lighter central tailplane 3 to be employed than would otherwise be the case.

On the other hand at higher incidence of the mainplane 4, and in particular in the cruise condition of the aircraft, the tip tails 10 can produce lift in the positive direction. By virtue of the interaction between the vortex upwash fields and the tip tails the latter can themselves be at a negative angle of physical incidence in this condition and yet have a positive angle of attack with respect to the local relative airflow, so that the tip tail lift vectors are inclined forwardly and contribute to the thrust requirements of the aircraft. Moreover this effect is enhanced by the tendency of the upwash field to strengthen as mainplane incidence increases.

The tip tails 10 can also provide a degree of natural gust alleviation for the outboard portions of the mainplane. For example a local upgust or velocity increase tending to lift the mainplane will also be mirrored by an increase of incidence and hence lift of the tip tail which in turn tends to twist down the mainplane, thereby damping the effect of the gust. The mainplane thus requires very little torsional stiffness, since it is aerodynamically stabilised. Furthermore, in a controlled roll, this same effect will cause the downgoing (hence increased incidence) wing of the mainplane to twist so as to reduce incidence, thus reducing what is known as roll damping which can be a serious issue limiting the maximum roll rate for large, light wings.

If desired the tip tails 10 can be provided with control surfaces or be all-moving, to vary the lift that they produce. This can in turn be used to apply variable degrees of twist to the mainplane and thus vary the wing lift distribution, e.g. for pitch and/or roll control of the aircraft or to provide "active" gust alleviation for the wings. In the latter respect by integrating a control system for the tip tails with pitot tubes or other air data sensors ahead of the mainplane at the span positions of the booms 9 the gust alleviation effect described above can be enhanced by controlling the tip tails to ensure a specified local lift distribution on the mainplane before the gust hits.

It is observed that the illustrated airframe configuration comprising tips 7 and tip tails 10 can contribute to drag reduction, at least in the cruise condition, in several ways. Firstly the lift vectors of the tip tails are inclined much further forward than for a conventional tailplane, thus more than counteracting the drag of the tip tails and their booms 9. Secondly the area of any inboard tail plane such as 3 can be reduced by more than the area of the tip tails, and in addition the fuselage loads are correspondingly reduced. Thirdly both the tips 7 and tip tails 10 increase the outboard wing lift beyond their wetted areas, thus providing a greater increase in lift than drag. Fourthly the combination of tips 7 and tip tails 10 leads to an optimum lift distribution, since the effective span of the mainplane 4 is increased more than the real span, which enables greater outboard wing chord and higher tip Reynolds number (lower drag).

The invention claimed is:

1. An aircraft comprising a mainplane, said mainplane comprising wings with canted down tips; wherein an additional plane is attached to an outboard location on each of said wings, and positioned aft with respect to the wing tips.

2. An aircraft according to claim 1 wherein each said additional plane is positioned to be subject to the upwash field of the respective mainplane tip vortex, at least in the cruise condition of the aircraft.

3. An aircraft according to claim 1 wherein each said additional plane extends outboard with respect to the respective said tip.

4. An aircraft according to claim 1 wherein each said additional plane is carried on a boom extending from the mainplane in the region of the root of the respective said tip.

5. An aircraft according to claim 1 wherein the lift vector of each said additional plane is inclined forwardly in the cruise condition of the aircraft.

6. An aircraft according to claim 1 wherein the downward cant angle of each said tip increases in the outboard direction thereof.

7. An aircraft according to claim 1 wherein in planform the leading and trailing edges of each said tip are swept back in relation to the leading and trailing edges respectively of the mainplane inboard thereof.

8. An aircraft according to claim 7 wherein in planform the sweep angles of the leading and trailing edges of each said tip increase in the outboard direction thereof.

9. An aircraft according to claim 1 wherein the chord of each said tip reduces in the outboard direction thereof.

10. An aircraft according to claim 1 wherein each wing of said mainplane includes an inboard portion having a chord which reduces in the outboard direction thereof, an outboard portion of substantially constant chord, and a said tip.

11. An aircraft according to claim 1 wherein each wing of said mainplane includes an inboard portion having a chord which reduces in the outboard direction thereof, an outboard portion having a positive dihedral angle, and a said tip.

12. An aircraft according to claim 10 wherein the root portion of each wing of said mainplane is of substantially constant chord.

13. An aircraft according to claim 11 wherein the root portion of each wing of said mainplane is of substantially constant chord.

14. An aircraft according to claim 1 wherein roll control is provided by means of spoilers on said tips.

15. An aircraft according to claim 1 wherein roll control is provided by varying the lift produced by said additional planes to vary the twist of said mainplane.

16. An aircraft according to claim 1 comprising sensors for sensing gusts ahead of said mainplane in the regions of the locations from which said additional planes are carried, and a system for controlling the lift produced by said additional planes in response to said sensors to vary the twist of said mainplane such as to alleviate the effect of gusts on said mainplane.

17. An aircraft according to claim 1 being a solar powered, unmanned aerial vehicle.

* * * * *